Aug. 18, 1970  3,524,696

WIDE ANGLE TYPE ZOOMING LENS

Filed June 19, 1968  2 Sheets-Sheet 1

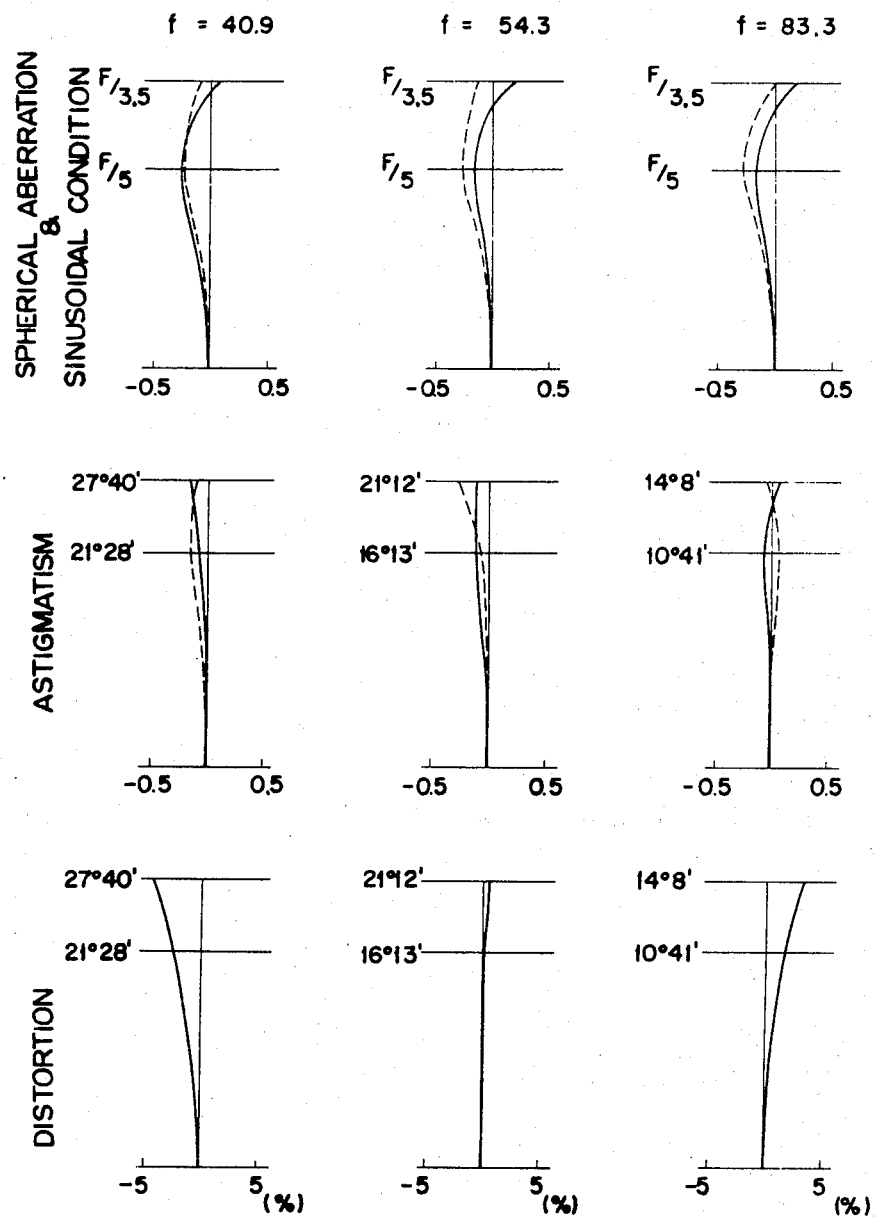

United States Patent Office 3,524,696
Patented Aug. 18, 1970

3,524,696
WIDE ANGLE TYPE ZOOMING LENS
Takashi Higuchi, Yokohama-shi, Japan, assignor to Nippon Kogaku K.K., Tokyo, Japan, a corporation of Japan
Filed June 19, 1968, Ser. No. 738,152
Claims priority, application Japan, June 21, 1967, 42/39,274
Int. Cl. G02b 9/00, 15/14, 1/00
U.S. Cl. 350—184                                    1 Claim

ABSTRACT OF THE DISCLOSURE

This invention relates to a wide angle type zooming lens comprising three lens groups i.e. a converging lens group, a diverging lens group and a converging lens group, and a converging relay lens system connected to said zooming system, the second lens group and the third lens group being movable. The first lens group is composed of a positive lens prepared by cementing divergent and convergent lenses and a convergent single lens. The second lens group is composed of a divergent single lens and a negative lens prepared by cementing divergent and convergent lenses, while the third lens group is composed of a positive lens prepared by cementing convergent and divergent lenses.

---

This invention relates to a wide angle type zooming lens, which is composed of a first converging lens group, a second diverging lens group, a third converging lens group and a fourth converging lens group, wherein the second and third lens groups are movable.

There have been developed a number of zooming lenses, but these conventional zooming lenses are concerned with zooming range of long focal length, particularly, the zooming lenses for still cameras. There are very few zooming lenses including the angle of view above 50°. Those zooming lenses which have been produced are large in size, or their performance has not been entirely satisfactory. At present, no compact, lightweight zooming lens of high performance has been developed and offered to the trade.

The zooming lenses for a still camera and for a movie camera are different. In the case of a zooming lens for a still camera, the view size becomes large and a wide angle zooming lens for such a camera becomes quick large in size at the same time the making compensation of the aberration in the peripheral portion of the view somewhat difficult.

This invention provides a wide angle type, highly efficient, miniature, light weight zooming lens for a still camera by overcoming the drawbacks as mentioned above. The zooming lens system provided hereby has an angle of view of over 55° at the shorter focal length which is not to be found in the present available zooming lenses.

As the causes which prevented the realization of the industrialization of zooming lens of wide angle type, and made it difficult to solve the confronting problems, the following items from (a) to (g) can be given.

(a) Since the wide angle is included, the distortion of barrel type and winder type system becomes more than 5% respectively at the minimum and maximum focal length, the distortion being great.

(b) When the whole system is made compact, the spherical aberration is excessively compensated toward the maximum focal length.

(c) As the sine conditions or coma are changed from minus to plus as zooming is done, the quality of the image is greatly deteriorated at both ends (the position of wide angle and telescopic positions) except for the intermediate focal length.

(d) The flatness of the image is broken down by the difference of the focal length and becomes unbalanced.

(e) When the zooming system is made smaller and when it is minimized as much as possible, astigmatism is increased. Namely, Sagittal image point is apt to be plus against the meridional image point.

(f) In zooming lens, when the focussing is done, the front group out-coming system is taken up, and the change of aberration is generated in accordance with the amount of out-coming, and the effect of the change of aberration is greater as more wide angle is included.

(g) In the case of wide angle, the light rays can pass through the peripheral portion of the lens. It is required to increase the external diameter of the lens, but it is impossible to attain wide angle because of a lack of the thickness at the periphery of the lens.

In accordance with this invention, a special construction is adopted to solve a number of problems as mentioned above, and a zooming lens of the wide angle type having excellent performance can be attained. Namely, the zooming lens of this invention is composed of a first convergent lens group, a second divergent lens group, a third convergent lens group, and a fourth convergent lens group, wherein the second and the third lens group are movable. The first lens group is composed of a positive lens made by cementing divergent and convergent lenses, and a convergent single lens, and the second lens group is composed of a divergent single lens and a negative lens made by cementing divergent and convergent lenses. The third lens group is made of a positive lens made by cementing convergent and divergent lenses, and the fixed fourth lens group follows the third lens group as a relay lens.

The zooming lens of this invention must satisfy the following conditions. When the principal plane intervals between the second lens group and the third lens group are set to be $L_{2,3}$ and the main plane intervals between the third and the fourth lens groups are set to be $L_{3,4}$ $$L_{2,3}W < L_{3,4}W \qquad (1)(a)$$
$$L_{3,4}W > L_{3,4}T \qquad (1)(b)$$

wherein W stands for the case of the minimum focal lengths, and T stands for the maximum focal length.

The refractive index of the front half of the lens prepared by cementing divergent and convergent lenses of the first lens group, against $d$ line are respectively $n_1$ and $n_2$, and the focal length of the convergent single lens following the same is set to be $f_1'$ with the radius of curvature of the front portion thereof set to be $R_4$ $$n_1 - n_2 > 0.12 \text{ and } n_1 > 1.74 \qquad (2)$$
$$0.35 f_1' < R_4 < 0.85 f_1' \qquad (3)$$

In the cemented lens of the third lens group, the radius of curvature of the front surface and the rear surface are respectively set to be $R_{11}$ and $R_{13}$ and the refractive index of the convergent and divergent lenses against $d$ line are respectively set to be $n_7$ and $n_8$, $$0.7|R_{13}| < R_{11} < 1.3|R_{13}| \qquad (4)$$

$$n_8 - n_7 > 0.1 \text{ and } n_8 > 1.74 \qquad (5)$$

The following are the explanations about the significance and the effect of the above given five condition formulae.

The condition Formula 1 is effective for removing the item (a) which is regarded as being the drawback of the wide angle type zooming lens. According to this condition, the third lens group is arranged in the opposite position found in the conventional arrangement. In the case of the shorter focal length, the third lens group is brought closer to the second lens group to the effect that distortion can be controlled from becoming excessively minus. At the same time, in the case of the maximum focal length, the second lens group and the third lens group are moved in the same direction with different distances to prevent the distortion from becoming excessively plus.

This condition is effective to compensate the unbalance of the sine condition of the item (c) above.

Condition Formula 2 is effective for compensating the unbalance of the image curvature in zooming as pointed out in item (d), and at the same time this condition formula is helpful for improving the drawback pointed out in item (g).

Namely, in the case of wide angle type zooming lens, the aslant light passes through the fringe portion of the front lens, and therefore it is necessary to provide a larger external diameter when compared with the focal length of the lenses composing the respective groups. However, it is impossible to increase the external diameter of the lens because there is a restriction in the thickness of the fringe portion of the lenses. It is therefore impossible to make the lens wide angle in accordance with the conventional methods.

In order to solve this problem, the condition Formula 2 is effective, and when the condition Formula 2 is satisfied, it is possible to provide some room for the thickness of the fringe portion of the lenses by increasing the radius of curvature of the cemented surface relatively by increasing the refractive index of the whole lens system and by retaining the difference of the refractive index of the divergent and convergent lenses. There is therefore a resultant advantage in that the covering angle of view can be increased.

Condition Formula 3: This is effective for removing the drawback of the item (d) and item (f). It is possible when this condition is satisfied to keep the flatness of the image surface at all times regardless of the distance from the camera to the object, or regardless of the length of the focal distance. This is an indispensable condition for the stabilization of the peripheral portion of the view.

Condition Formula 4 and the condition Formula 5 are the conditions for the lens prepared by cementing a convergent lens and a divergent lens of the third lens group. The two conditions have mutual relation and they are helpful for improving the drawbacks of items (b), (d), and (e).

In particular, the condition Formula 5 is most effective for solving the problems of the item (e). For example, in order to make the whole system as small and light as possible, the zooming rate must be decreased, but since the optical load is given to the zooming system, aberrations are increased in the conventional systems. In particular, astigmatism is increased in the peripheral portion of the view, and the deterioration of the image quality is generated. The condition Formula 5 lowers the refractive index of the convergent lens in the third lens group, and the refractive index of the divergent lens is increased as much as possible, thereby preventing any great increase of astigmatism.

As is apparent from the above given explanations, when the conditions from 1 to 5 are satisfied, it is possible to realize a wide angle type zooming lens for still cameras which has been previously regarded as being very difficult to provide.

This invention will be described more clearly referring to the illustrative embodiments shown in table and the attached drawing, in which:

FIG. 2 shows the aberration curve at the minimum, intermediate and maximum focal length.

Figure 1:
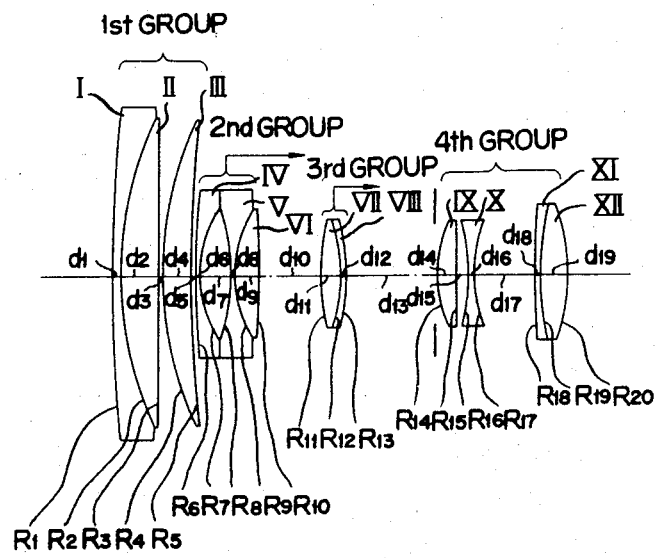
FIG. 1 is a diagram showing the structure of a lens embodying one form of the invention.

The following are the embodiments of this invention. In the following table and FIG. 1; $R_1$, $R_2$ ... $R_{20}$ are the radii of curvature of the respective lenses (I, II, ... XII), $d_1$, $d_2$ ... $d_{12}$ are the central thickness of the respective lenses and air spaces, and $n_1$, $n_2$ ... $n_{12}$ are the refractive index of the respective glass materials by $d$ line, and $v_1$, $v_2$ ... $v_{12}$ are the Abbe's numbers of said glass materials and W shows the case of wide angle, and M shows the standard case, and T shows the telescopic case.

$$f = 40.9 \sim 83.3 \qquad F/3.5$$

Angle of view $55°20' \sim 28°16'$

| | (W) (M) (T) | | |
|---|---|---|---|
| $R_1 = +248.430$ | $d_1 = 1.1$ | $n_1 = 1.86150$ | $v_1 = 23.0$ |
| $R_2 = +76.430$ | $d_2 = 7.0$ | $n_2 = 1.66895$ | $v_2 = 57.3$ |
| $R_3 = -728.608$ | $d_3 = 0.1$ | | |
| $R_4 = +56.200$ | $d_4 = 5.7$ | $n_3 = 1.79719$ | $v_3 = 45.4$ |
| $R_5 = +208.759$ | $d_5 = 0.87 \sim 13.84 \sim 27.16$ | | |
| $R_6 = +147.250$ | $d_6 = 0.6$ | $n_4 = 1.69678$ | $v_4 = 55.8$ |
| $R_7 = +19.604$ | $d_7 = 5.6$ | | |
| $R_8 = -32.884$ | $d_8 = 0.5$ | $n_5 = 1.62087$ | $v_5 = 60.1$ |
| $R_9 = +19.704$ | $d_9 = 4.0$ | $n_6 = 1.74119$ | $v_6 = 27.7$ |
| $R_{10} = -453.106$ | $d_{10} = 11.59 \sim 8.06 \sim 0.47$ | | |
| $R_{11} = +44.233$ | $d_{11} = 3.7$ | $n_7 = 1.58810$ | $v_7 = 50.9$ |
| $R_{12} = -21.950$ | $d_{12} = 0.7$ | $n_8 = 1.86146$ | $v_8 = 23.1$ |
| $R_{13} = -44.085$ | $d_{13} = 17.00 \sim 7.56 \sim 1.83$ | | |
| $R_{14} = +23.344$ | $d_{14} = 3.6$ | $n_9 = 1.71716$ | $v_9 = 48.4$ |
| $R_{15} = \infty$ | $d_{15} = 1.25$ | | |
| $R_{16} = -57.573$ | $d_{16} = 2.7$ | $n_{10} = 1.70212$ | $v_{10} = 41.0$ |
| $R_{17} = +20.600$ | $d_{17} = 10.5$ | | |
| $R_{18} = +141.455$ | $d_{18} = 0.8$ | $n_{11} = 1.76224$ | $v_{11} = 26.5$ |
| $R_{19} = +46.509$ | $d_{19} = 5.2$ | $n_{12} = 1.69678$ | $v_{12} = 55.8$ |
| $R_{20} = -30.911$ | | | |

Figure 1A:
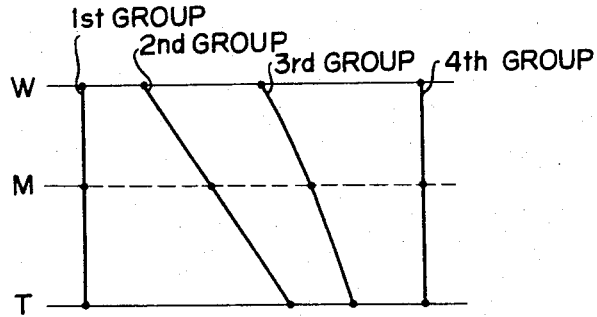
FIG. 1A shows diagrammatically the movements of four groups.

FIG. 1A diagrammatically shows the movements of four groups. The first and fourth groups are immovable, while the second and third groups are moved in the same direction with different distances, respectively. In FIG. 1A, W, M and T have the same meanings as explained hereinbefore.

What is claimed is:

1. Wide angle type zooming lens comprising a zooming system consisting of three lens groups i.e., a converging lens group, a diverging lens group and a converging lens group, and a converging relay lens system connected to said zooming system, the second lens group and the third lens groups being movable, and in which the first lens group is composed of a positive lens consisting of cemented divergent and convergent lenses and a convergent single lens, the second lens group being composed of a divergent single lens and a negative lens consisting of cemented divergent and convergent lenses, the third lens group being composed of a positive lens consisting of cemented convergent and divergent lenses, and wherein the complete system has the following data:

$f = 40.9 \sim 83.3 \quad F/3.5$
Angle of view $55°20' \sim 28°16'$

|  | (W) (M) (T) |  |  |
| --- | --- | --- | --- |
| $R_1 = +248.430$ | $d_1 = 1.1$ | $n_1 = 1.86150$ | $v_1 = 23.0$ |
| $R_2 = +76.430$ | $d_2 = 7.0$ | $n_2 = 1.66895$ | $v_2 = 57.3$ |
| $R_3 = -728.608$ | $d_3 = 0.1$ |  |  |
| $R_4 = +56.200$ | $d_4 = 5.7$ | $n_3 = 1.79719$ | $v_3 = 45.4$ |
| $R_5 = +208.759$ | $d_5 = 0.87 \sim 13.84 \sim 27.16$ |  |  |
| $R_6 = +147.250$ | $d_6 = 0.6$ | $n_4 = 1.69678$ | $v_4 = 55.8$ |
| $R_7 = +19.604$ | $d_7 = 5.6$ |  |  |
| $R_8 = -32.884$ | $d_8 = 0.5$ | $n_5 = 1.62087$ | $v_5 = 60.1$ |
| $R_9 = +19.704$ | $d_9 = 4.0$ | $n_6 = 1.74119$ | $v_6 = 27.7$ |
| $R_{10} = -453.106$ | $d_{10} = 11.59 \sim 8.06 \sim 0.47$ |  |  |
| $R_{11} = +44.233$ | $d_{11} = 3.7$ | $n_7 = 1.58810$ | $v_7 = 50.9$ |
| $R_{12} = -21.950$ | $d_{12} = 0.7$ | $n_8 = 1.86146$ | $v_8 = 23.1$ |
| $R_{13} = -44.085$ | $d_{13} = 17.00 \sim 7.56 \sim 1.83$ |  |  |
| $R_{14} = +23.344$ | $d_{14} = 3.6$ | $n_9 = 1.71716$ | $v_9 = 48.4$ |
| $R_{15} = \infty$ | $d_{15} = 1.25$ |  |  |
| $R_{16} = -57.573$ | $d_{16} = 2.7$ | $n_{10} = 1.70212$ | $v_{10} = 41.0$ |
| $R_{17} = +20.690$ | $d_{17} = 10.5$ |  |  |
| $R_{18} = +141.455$ | $d_{18} = 0.8$ | $n_{11} = 1.76224$ | $v_{11} = 26.5$ |
| $R_{19} = +46.509$ | $d_{19} = 5.2$ | $n_{12} = 1.69678$ | $v_{12} = 55.8$ |
| $R_{20} = -30.911$ |  |  |  | wherein $R_1, R_2 \ldots$ represent the radii of curvature of the individual surfaces; $d_1, d_2 \ldots$ represent the axial thickness of the individual elements and the air spacing between the components; $n_1, n_2 \ldots$ represent refractive indices of the elements; $v_1, v_2 \ldots$ represent Abbe's numbers of the elements; and W, M and T represent the cases of wide angle, standard and telescopic.

References Cited

UNITED STATES PATENTS 3,059,536  10/1962  Cox et al. ———————— 350—214 X

FOREIGN PATENTS 1,008,309  10/1965  Great Britain.

DAVID SCHONBERG, Primary Examiner

P. A. SACHER, Assistant Examiner

U.S. Cl. X.R.

350—176, 214